Figure 1:
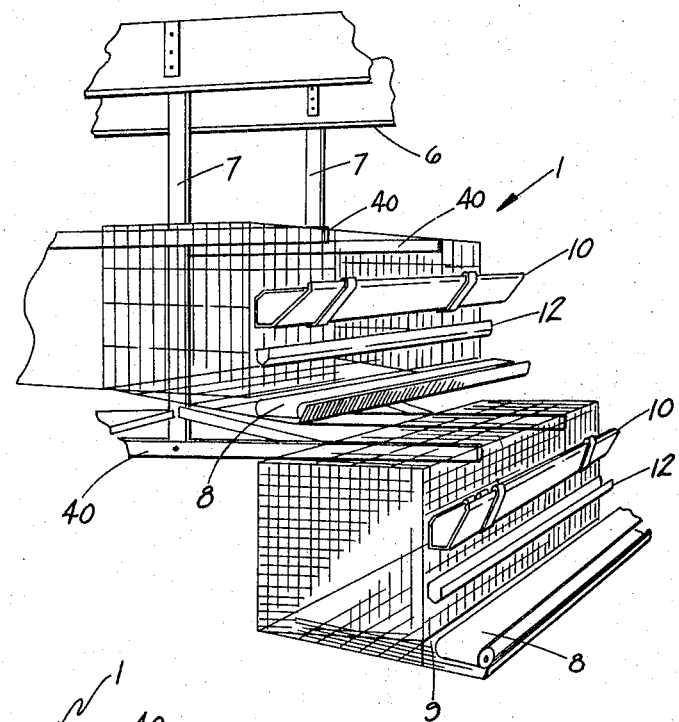

March 28, 1967  J. GRAVES  3,311,087
POULTRY CAGE ROW SUPPORT SYSTEM
Filed Oct. 21, 1965  2 Sheets-Sheet 1

INVENTOR.
JEWEL GRAVES
BY
ATTORNEYS

March 28, 1967 J. GRAVES 3,311,087
POULTRY CAGE ROW SUPPORT SYSTEM
Filed Oct. 21, 1965 2 Sheets-Sheet 2

INVENTOR.
JEWEL GRAVES
BY
ATTORNEYS

United States Patent Office 3,311,087
Patented Mar. 28, 1967

3,311,087
POULTRY CAGE ROW SUPPORT SYSTEM
Jewel Graves, Holland, Mich., assignor to Big Dutchman, Inc., Zeeland, Mich., a corporation of Michigan
Filed Oct. 21, 1965, Ser. No. 499,914
5 Claims. (Cl. 119—18)

This invention relates to fowl cage support systems for elongated rows of cages, and more particularly to a cage support system for poultry or other fowl, wherein the relative rigidity of associated hardware is utilized in interrelated fashion to support the poultry cage row.

It has become customary in the poultry business to house the poultry in elongated rows of adjacent cages, often extending the entire length or width of the building, to confine hundreds or even thousands of birds in each row. The cages are elevated so that the droppings may fall from cages onto the building floor. Often these elongated cage rows are hung in back to back relationship and tiered one above the other in order to minimize the number of supports necessary in any given area. More particularly, one set of floor or ceiling supports may retain a number of cage rows in the elevated position.

The cages may be supported in their elevated positions by either cage hangers affixed to the rafters or joists of the building or, alternatively, they may be elevated from the floor by means of support legs. Where the hanger method is utilized it is economically desirable to use as few hangers as possible. Additionally, the relatively large spacings between rafters in buildings suitable for this type of operation normally necessitates similar spacings between cage hangers. Where floor supports are utilized it is desirable to have as few supports as possible since they interfere with cleaning of the floor.

Automated elongated feed troughs and water troughs are generally supported along each cage row in such a manner that the birds may eat and drink by projecting their heads between the wires of the cages.

Usually, the floors of the elongated cages are slanted. An opening is provided along one side of the cage such that eggs will roll down the slanted floor and out of the cage onto an adjacent egg collection means such as a conveyor belt to be carried thereby to a sorting and distribution point.

It is desirable from economic and ease of installation standpoints to utilize cages fabricated from interconnected relatively light gauge wire elements. Yet, since the combined weight of the birds, of the troughs, of the feed and water, and of the cages themselves is very substantial, the rows of wire cages exhibit a number of structural support problems, chiefly sagging. Due to the desired or necessary spacing of the cage hangers or the floor supports, the cage rows tend to sag between support points. This sagging causes difficulty because it tends to prevent uniform distribution of food and water to the birds along the cage row. Further, the egg exits may no longer be aligned with the egg conveyor.

Not only does the cage row sag, but also the bottoms of the individual cages tend to sag between supports or partitions due to the relatively large number of birds which can be closely grouped in cages when feeding, watering, etc., is automatically accomplished. The bottom sag of the cage between its walls or partitions is undesirable because it interferes with the eggs rolling out onto the conveyor belt, because it has a tendency to cause the poultry to bunch at the low point in the particular section, and because this weakens the cage structurally.

It is an object of this invention to provide an elevated poultry cage row support system which uniquely interrelates the structural characteristics of the cage, trough, and hanger assembly so that sagging of the cages between supports is substantially eliminated.

More specifically, it is an object of this invention to provide a support system for poultry cage rows wherein the relative rigidity of the feed or water troughs, which are suspended from the cage rows, may be in turn utilized to reinforce the cage row against sagging between supports.

It is an object of this invention to provide a system of poultry cage supports wherein only one of the water and feed troughs need be fabricated from relatively rigid material.

It is another object of this invention to provide a fowl cage construction having a unique interconnection of elements to restrain individual cage bottom sagging in a manner which is both simple and inexpensive, and yet, is effective to substantially prevent sagging of the bottoms of the cage sections.

Another object of this invention is to provide a fowl cage row support assembly having resistance against sag of the cage row and of individual cage bottoms by utilizing (1) a unique interrelation of the cage row and the supply trough means suspended thereon to rigidify the entire row against sagging, and (2) the mesh portions of the individual cages to rigidify individual cage bottoms from sagging.

Figure 2:
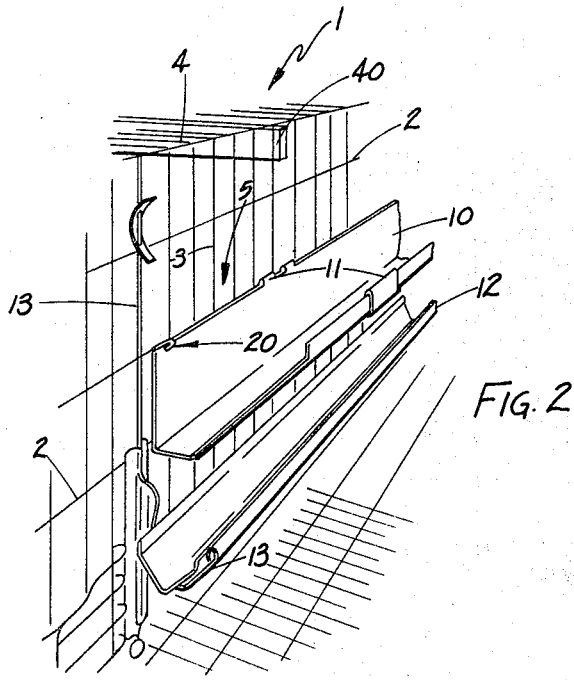
Figure 3:
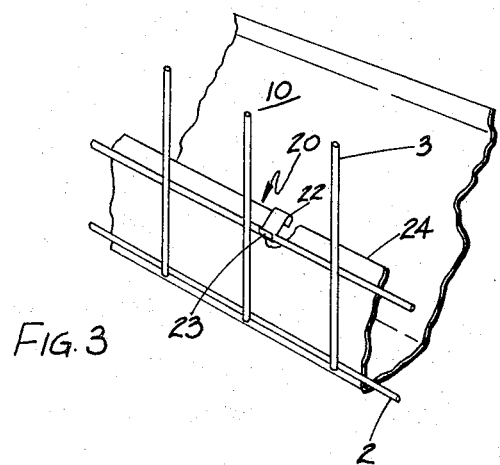
Figure 4:
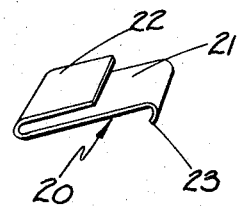
Figure 5:
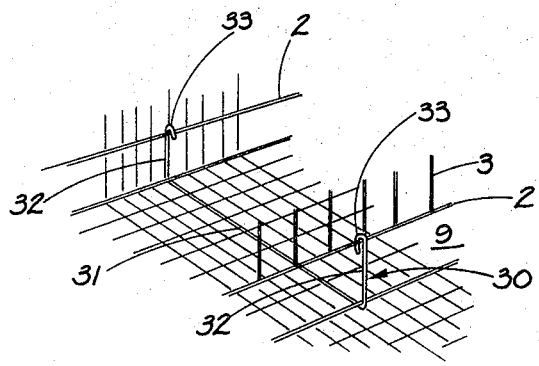

These and other objects of this invention will be readily apparent by reference to the following figures in which:
 FIG. 1 is a partially broken perspective view of a tiered cage section;
 FIG. 2 is a perspective view of a segment of an elongated cage between roof hangers;
 FIG. 3 illustrates in broken perspective the details of the manner in which the trough clip is affixed to the trough and thereby supports the cage;
 FIG. 4 is a perspective view of the trough clip; and
 FIG. 5 illustrates in broken perspective the details of the cage bottom sag restrainer.

Briefly, these and other objects of this invention are accomplished by utilizing an inter relationship between a cage row and a relatively rigid feed or water supply trough which is affixed to and suspended from the elongated cage row at positions in relative vertical alignment with the cage row hangers or floor supports. The cage row provides suspension support for the supply trough means, and the supply trough means provides sag resistent support for the cage row. In so doing, a plurality of special, spaced cage row support clips are spaced along the length of the trough between the trough hangers to support the cage row on the trough by the clips, and the trough on the cage row by the hangers. These cage support clips have a hook portion which engages an upper edge portion of the trough, and also have an extending lip upon which one of the wires of the cage rests, thereby preventing cage sagging between hangers or floor supports.

In order to prevent sagging of the individual cage sections between partitions, a generally U-shaped reinforcing support is passed around and beneath the bottom of the cage and partially up the walls. The U-shaped reinforcing support has hooked ends on its spaced legs which engage the wires of the cage walls to hold up the bottom cross leg and thus prevent sagging of the bottom or floor of the cage.

Referring now to the drawings a preferred embodiment of the invention will be described in detail. FIGS. 1 and 2 show an elongated mesh cage row 1 which may be woven in a well known manner from pluralities of longitudinal 2, vertical 3 and planar 4 wires. The elongated cage row is divided into individual cages by a plurality of mesh wall partitions 5.

As shown in FIG. 1, the elongated cage is supported at intervals from the rafters 6 of the poultry house by suitable spaced cage hangers 7 having horizontal cage support members 40 horizontally affixed thereto. While only one segment of the elongated cage is shown, it is to be understood that several such segments would be longitudinally aligned and affixed together in actual use to form cage rows. Moreover, the cage rows may be arranged in adjacent, parallel, back to back fashion with one set of inserted T-shaped hangers supporting both rows. Likewise, a plurality of such rows may be arranged in elevational relationship. It is to be further understood that while FIG. 1 shows the elongated cage suspended from the ceiling it could be supported from the floor without departing from the spirit and scope of this invention.

As shown in FIGS. 1 and 2 a feed trough 10 and a water trough 12 run the entire length of the cage row assembly along one side thereof. The feed trough is affixed to the cage by means of feed trough hangers 11. It is normally supplied by an internal recirculating feed supply chain (not shown) or the equivalent. Feed trough hangers 11 are positioned directly below the cage hangers 7 such that the weight of the fed trough is directly in line with the hanger. The water trough 12 is held in place by means of water trough hangers 13. An egg conveyor belt 8 may conveniently be positioned as shown. Eggs roll from the cage through longitudinal opening 9 onto the conveyor belt.

The feed trough 10 is fabricated from a relatively rigid material, usually sheet metal. As shown in FIGS. 2, 3 and 4, one or a plurality of feed trough clips 20 are positioned between the feed trough hangers 11. The feed trough clip 20 is a rigid tensile support member which has a relatively planar body 21, a trough receiving or hooked portion 22 extending from one end thereof, and a cage support lip 23 at the other end. As shown best in FIG. 3, the trough receiving portion 22 engages the edge of trough receiving flange 24. The longitudinal wire of the cage row mesh is then elevated and placed upon cage supporting lip 23 to support this section of the cage row against sagging of the cage row between hangers. As many of the feed trough clips may be utilized between hangers as is necessary to prevent sagging. Thus, in reality, the cage hangers support the trough through those portions of the cage directly beneath the hangers while the trough supports the between hangers.

While the feed trough clips 20 are effective to prevent sagging of the cage row between hangers, they do not prevent the sagging of the bottoms of individual cages between partitions 5. As shown in FIG. 4, this invention prevents such sagging by providing a rigid, cage bottom sag restrainer 30 which is generally U-shaped. The cage bottom sag restrainer 30 has an elongated bottom support member 31 with a length approximately the same as the width of the base of the cage. Extending from and affixed to each extremity of support member 31 are vertical arms 32. Vertical arms 32 are bent over at their upper extremities to form longitudinal wire engaging hooks 33. These hooks engage the longitudinal wires of the cage in such a manner that support member 31 is pressed up against the bottom of the cage. Such pressing prevents sagging of the bottom of the cage segments between partitions. It should be noted, of course, that when slanted bottom cages are utilized the cage bottom sag restrainer will not be truly U-shaped, but are considered generally U-shaped as that term is used in this application.

Thus is will be seen that through the utilization of the relatively inexpensive trough clips and cage bottom sag restrainers which are the subject of this invention sagging between support members of elongated poultry cages is virtually eliminated. The elimination of such sagging prevents associated sagging of the feed and water troughs without necessitating the utilization of rigid materials for both. It also insures that the egg exits will remain aligned with the conveyor belt and that the birds will not bunch within the cage segments.

The components which are added to the conventional assembly are extremely simple, it is realized. Indeed, a good deal of uniqueness of the novel concept in the cage row assembly is that very significant improvement in the assembly is achieved with such remarkably simple components used in a particular interrelationship.

It will be readily apparent to those skilled in the art that the choice of which trough to utilize as a horizontal support member is not critical. Indeed, both the feed and water troughs may be so utilized if deemed necessary.

While several preferred embodiments of this invention have been described together with minor modifications, it will be recognized that other modifications may be made without departing from the scope and spirit of the invention. Such modifications are to be deemed as included within the scope of the following claims unless these claims, by their language, expressly state otherwise.

I claim:
1. A poultry enclosure comprising:
an elongated wire mesh cage row forming a plurality of individual cages and formed of a plurality of vertically and horizontally arranged wire members;
cage row supports engaging the horizontally arranged wire members at the top portion of said cage row at spaced intervals along the length thereof and suspending said elongated cage now in elevated fashion;
a relatively rigid supply trough running the length of said cage row along one side thereof;
a plurality of trough hangers affixing said trough to said cage row at points in proximate vertical alignment with said cage row supports so that the weight of said trough is supported substantially by vertically arranged wire members located in approximate vertical alignment with said cage row supports whereby said last mentioned vertically arranged wire members are in tension, said cage providing the only support for said trough;
and a plurality of support means spaced between said trough hangers, said support means having a portion for engaging the trough and having another portion engaging said wire members whereby said elongated cage row at points between said trough hangers is supported by said trough to prevent sagging between said cage row supports.

2. The poultry enclosure of claim 1 in which the support means spaced between the trough hangers are a plurality of clips having a hooked portion for engaging the inner and upper portion of said trough and having an extended lip on which one wire of said mesh cage is supported.

3. The poultry enclosure of claim 1 in which a plurality of reinforcing supports are positioned along the length of said cage row, said reinforcing supports passing around the bottom of individual cages and having hooks engaging the wire mesh sides of said cage row whereby the bottom segments of said cages are restrained from sagging.

4. The device of claim 3 in which the reinforcing supports are generally U-shaped.

5. The poultry enclosure of claim 1 in which the support means spaced between the trough hangers are a plurality of clips having a hooked portion for engaging the inner and upper portion of said trough and having an extended lip on which one wire of said mesh cage is supported; and in which a plurality of reinforcing supports are positioned along the length of said cage row, said reinforcing supports passing around the bottoms of individual cages and having hooks engaging the wire mesh sides of said cage row whereby the bottom segments of said cages are restrained from sagging.

References Cited by the Examiner
UNITED STATES PATENTS

| | | | |
|---|---|---|---|
| 1,807,972 | 6/1931 | Dean | 119—18 X |
| 1,812,684 | 6/1931 | Carpenter | 119—18 |
| 2,863,418 | 12/1958 | Pockman | 119—18 |
| 2,882,857 | 4/1959 | Ernst et al. | 119—18 |
| 3,208,430 | 9/1965 | Ernst | 119—18 |

ALDRICH F. MEDBERY, *Acting Primary Examiner.*

HUGH R. CHAMBLEE, SAMUEL KOREN,
*Examiners.*